US008994953B2

(12) United States Patent
Crickmore

(10) Patent No.: US 8,994,953 B2
(45) Date of Patent: Mar. 31, 2015

(54) PHASED BASED SENSING

(75) Inventor: Roger Ian Crickmore, Wareham (GB)

(73) Assignee: Qinetiq Limited (GB)

( * ) Notice: Subject to any disclaimer, the term of this patent is extended or adjusted under 35 U.S.C. 154(b) by 194 days.

(21) Appl. No.: 13/060,546

(22) PCT Filed: Aug. 20, 2009

(86) PCT No.: PCT/GB2009/002035
§ 371 (c)(1),
(2), (4) Date: Feb. 24, 2011

(87) PCT Pub. No.: WO2010/023434
PCT Pub. Date: Mar. 4, 2010

(65) Prior Publication Data
US 2011/0149295 A1 Jun. 23, 2011

(30) Foreign Application Priority Data
Aug. 27, 2008 (GB) .................... 0815523.6

(51) Int. Cl.
*G01B 9/02* (2006.01)
*G01D 5/353* (2006.01)
*G01V 1/16* (2006.01)

(52) U.S. Cl.
CPC ............ *G01D 5/35303* (2013.01); *G01V 1/16* (2013.01)
USPC ....................................... 356/478

(58) Field of Classification Search
CPC ................................ G01D 5/35303
USPC ............. 356/484, 478, 482, 382; 250/227.12, 250/227.14; 385/12
See application file for complete search history.

(56) References Cited

U.S. PATENT DOCUMENTS

| | | | |
|---|---|---|---|
| 4,121,155 A | 10/1978 | Chamuel | |
| 4,231,260 A | 11/1980 | Chamuel | |
| 4,649,529 A * | 3/1987 | Avicola | 367/149 |
| 4,697,926 A * | 10/1987 | Youngquist et al. | 356/478 |
| 4,699,513 A | 10/1987 | Brooks et al. | |
| 4,770,535 A | 9/1988 | Kim et al. | |
| 4,848,906 A | 7/1989 | Layton | |
| 4,885,462 A * | 12/1989 | Dakin | 250/227.19 |
| 4,947,037 A | 8/1990 | Nash et al. | |
| 5,039,221 A * | 8/1991 | Layton et al. | 356/478 |
| 5,140,154 A | 8/1992 | Yurek et al. | |
| 5,412,474 A * | 5/1995 | Reasenberg et al. | 356/486 |
| 5,680,489 A | 10/1997 | Kersey | |

(Continued)

FOREIGN PATENT DOCUMENTS

| | | |
|---|---|---|
| GB | 2442745 | 4/2008 |
| WO | WO 87/06690 | 11/1987 |

(Continued)

*Primary Examiner* — Kara E Geisel
*Assistant Examiner* — Maurice Smith
(74) *Attorney, Agent, or Firm* — McDonnell Boehnen Hulbert & Berghoff LLP

(57) ABSTRACT

Interrogation of a phase based transducer is performed by temporally overlapping and interfering a single pulse output from the transducer to determine the rate of change with time of the measurand represented as a phase change. The rate of change, or derivative of the phase change typically has a much smaller amplitude than the signal itself, and the derivative measurement therefore has reduced sensitivity. In this way, large amplitude signals which might otherwise be subject to overscaling effects can be measured more effectively.

20 Claims, 6 Drawing Sheets

(56) References Cited

U.S. PATENT DOCUMENTS

| | | | |
|---|---|---|---|
| 5,787,053 A * | 7/1998 | Ames et al. | 367/149 |
| 6,449,046 B1 | 9/2002 | Huang et al. | |
| 6,466,706 B1 | 10/2002 | Go et al. | |
| 6,522,797 B1 | 2/2003 | Siems | |
| 6,591,025 B1 * | 7/2003 | Siems et al. | 385/12 |
| 6,785,004 B2 * | 8/2004 | Kersey et al. | 356/478 |
| 7,072,566 B2 * | 7/2006 | Seo et al. | 385/147 |
| 7,119,325 B2 | 10/2006 | Pieterse | |
| 7,424,191 B2 | 9/2008 | Tadakuma et al. | |
| 7,433,045 B2 * | 10/2008 | Ronnekleiv et al. | 356/478 |
| 7,869,014 B2 | 1/2011 | Tadakuma et al. | |
| 2005/0078316 A1 | 4/2005 | Ronnekleiv et al. | |
| 2007/0024857 A1 * | 2/2007 | Menezo | 356/478 |
| 2007/0041020 A1 | 2/2007 | Hall | |
| 2007/0097376 A1 * | 5/2007 | Courville et al. | 356/487 |
| 2007/0097377 A1 * | 5/2007 | Courville et al. | 356/487 |
| 2008/0277568 A1 | 11/2008 | Crickmore | |
| 2008/0291461 A1 * | 11/2008 | Waagaard et al. | 356/478 |

FOREIGN PATENT DOCUMENTS

| | | |
|---|---|---|
| WO | WO 00/12977 | 3/2000 |
| WO | WO 2006/048647 | 5/2006 |
| WO | WO 2007/021287 | 2/2007 |
| WO | WO 2008/110780 | 9/2008 |
| WO | WO 2010/004249 | 1/2010 |

* cited by examiner

PHASED BASED SENSING

FIELD OF THE INVENTION

The present invention relates to sensors which exploit a change in phase of an interrogation signal to determine a sensed parameter, and particularly, but not exclusively to fibre optic interferometric sensing. The present invention finds particular application in the field of seismic surveying.

BACKGROUND OF THE INVENTION

Certain types of fibre optic sensors employ a length of optic fibre arranged in such a way that a sensed parameter causes a strain to be imposed on the fibre. Typically the fibre is arranged in a coil, although other arrangements are possible. Such strain causes a change in phase of optical signal propagation in that fibre, which change can be detected by interferometric techniques. A variety of different arrangements for this type of transducer have previously been proposed, many of which have the coil of optic fibre wound on a deformable core or mandrel, which undergoes radial expansion or contraction in response to the sensed parameter, such as sensed vibration.

Such fibre optic sensors can exhibit extremely high sensitivities, and have the advantage of being completely passive, employing no power at the sensing transducer. Such sensors have also proved popular in applications where large arrays of sensors are required, on account of the relative ease with which they can be multiplexed.

An example of such an application is seismic surveying in the oil and gas exploration industry, where large time multiplexed arrays comprising hundreds or even thousands of vibration sensors and/or hydrophones can be used to sense reflections of an incident pulse from geological formations beneath the sea bed. Sampling such an array at regular periods provides 3D time lapsed data on existing or potential new reserves.

In greater detail, a high amplitude seismic source (usually an airgun) is towed across the top of a known or potential oilfield, firing the source at regular intervals, and the reflected returns form the source are monitored using sensors which are either towed together with the source or are positioned on the seabed. It is desired to be able to measure directly both the direct signal from the airgun when it first hits the sensors, and the seismic returns reflected from the underground features within the field, which have significantly lower amplitudes.

A problem experienced with this approach to sensing is that, for a given sampling rate, signals above a certain amplitude threshold cause the phase based sensed information to become distorted, and can cause failure of the demodulation process. This effect, commonly referred to as overloading or overscaling is dependent on the frequency of the measured signal. In seismic systems this can cause a particular problem with the direct arrival of the incident pulse, especially when that pulse has been generated close to the sensors (usually by an airgun towed from a surface vessel as it passes over the array). It is desirable to be able to record this incident pulse without the distortion that overscale can produce.

Applicant's co-pending International patent application No. PCT/GB2008/000830 describes apparatus and techniques for determining the derivative of the phase with respect to time which is imposed by a transducer (or a mulitiplexed array of transducers) on an interrogating signal. This technique is referred to as the derivative sensor technique (DST).

The rate of change, or derivative of the phase typically has a much smaller amplitude than the signal itself since the difference between the two times at which the signal is measured will usually be much less than the period of the signal being measured. Thus DST provides a reduced sensitivity measurement. For a signal with the majority of its energy centred at approximately 800 Hz, for example, the derivative of that signal will typically be attenuated by at least 60 dB with a period between the two measurement times of 200 ns.

PCT/GB2008/000830 describes multiple means of generating derivative signals with different amplitudes by using a different optical return methods and architecture, employing optical pulse pairs with different separations, where the length of separation determines the amplitude of the channel. This can result in derivative outputs with levels which are approximately 50 dB lower at 800 Hz (described as "medium DST") and 38 dB lower at 800 Hz (described as "long DST")

The level of the derivative signal is proportional to the difference in time between when the pulses pass through the sensor. Decreasing this time difference reduces the level of the derivative signal but increases the maximum level of the dynamic signal that can be measured. There is a practical limit, however, on the minimum time difference between pulse pairs in the multiplexed arrays described above.

It is an object of the present invention to provide improved sensing methods and apparatus, and an object of certain embodiments of the invention to provide improved methods and apparatus for sensing using a multiplexed fibre optic sensor array.

SUMMARY OF THE INVENTION

According to a first aspect of the present invention there is provided a method of interrogating a phase based transducer, said transducer providing a change in phase of signal propagation in response to a sensed parameter, said method comprising receiving a single pulse signal frequency propagated through said transducer; combining a delayed version and an undelayed version of the single pulse signal; and determining from said combination a measure of the rate of change of phase with time of said signal.

The level of the derivative signal is proportional to the difference in time between when the pulses pass through the sensor. Decreasing this time difference reduces the level of the derivative signal but increases the maximum level of the dynamic signal that can be measured. Thus to measure very large dynamic signals it will be necessary to have a very short time separation.

In previously proposed techniques for obtaining a derivative signal, as described above, a pulse pair is input to an array, and the time separation between the pulses can determine the level of sensitivity which results. For a number of practical considerations it is often desirable that the optical pulses have a minimum width which is of the order of 100 ns. Therefore the minimum time difference between pulses is also 100 ns otherwise an output interferometer can not be used to realign the two pulses.

In the present invention however only a single pulse need be received from a sensor or array of sensors, and the constraints imposed by the arrangement of pulse pairs are lessened. As such, the received signal can be combined with a version having been delayed by only a very short duration, and delays of less than 100 ns or less than 50 ns are achievable. In the example described below delays of 10 ns or less are used.

The received signal is a substantially square wave pulse in a typical embodiment. The pulse may be part of a train of pulses for example, but each received pulse can be delayed by a small amount such that it temporally overlaps with the undelayed version with which it is combined. In other words, the delay is less than the pulse duration, such that temporally misaligned versions of the same pulse are combined.

In embodiments the pulse will comprise a single frequency. To ease the extraction of the dynamic signal representing the derivative information, the frequency of the delayed version is shifted relative to the frequency of the undelayed version in embodiments. Where an interferometer is used to delay and combine the received signal, differing frequency shifts can be imposed on the signals in the respective arms of the interferometer.

The actual value of the sensed parameter can be reconstructed by integrating the measured derivative value. However, if the noise floor is determined by system noise, then the noise floor is substantially the same for both the phase information and its derivative, the derivative signal suffers from a lower SNR.

As will be described below in greater detail, overloading occurs when the instantaneous frequency of the output of the transducer (which depends on the rate of change of phase) falls outside of the Nyquist frequency range determined by the rate at which this signal is sampled. Any instantaneous frequency that falls outside the Nyquist range will be folded about the limits of the range back into it. Depending on the amplitude and frequency of the sensed signal, the information may be folded or wrapped about the Nyquist frequency limits multiple times. The present inventors have found that the derivative information measured in embodiments of the present information can be used to determine how many times the information has been wrapped, or the factor by which the information exceeds the Nyquist limit. This then allows the directly measured parameter value to be corrected to provide a signal having an improved SNR to that provided by integrating the measured derivative signal.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE DRAWINGS

Preferred features of the present invention will now be described, purely by way of example, with reference to the accompanying drawings, in which.

DESCRIPTION OF THE INVENTION

Figure 1:
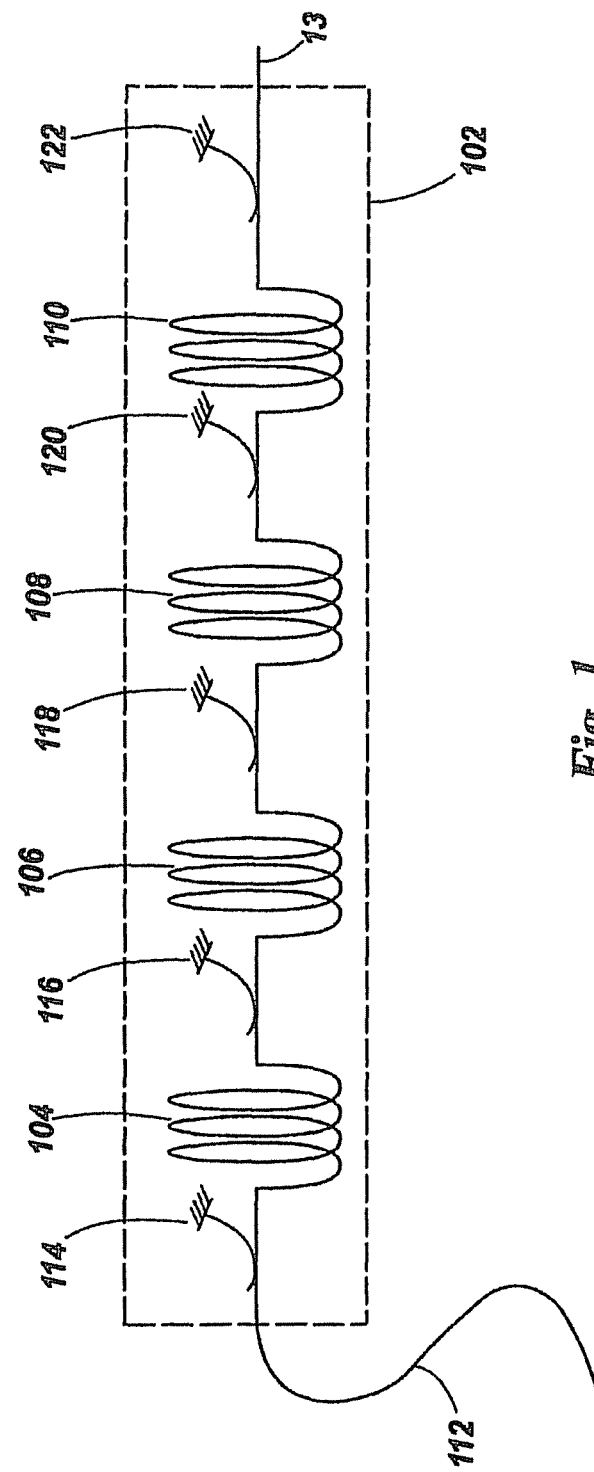
FIG. 1 shows a known type of fibre optic sensor package.

Referring to FIG. 1, there is shown schematically a known type of fibre-optic sensor package, indicated generally 102, comprising four individual fibre-optic sensing coils 104, 106, 108, 110 formed from a single length of optical fibre 13, and arranged in series. A portion of the optical fibre 112 serves as the package input/output (i/o) fibre. Fibre-coupled mirrors 114, 116, 118, 120, 122 are coupled to the optical fibre 13 at respective locations along it such that each of the coils has a fibre-coupled-mirror coupled at each end of it. Other means of reflecting a portion of light from before and after each sensor such as in fibre Bragg gratings could be used instead of the fibre coupled mirrors. A large scale array of such packages can be coupled together, and interrogated periodically using multiplexing to provide time lapsed seismic imagery for example.

Figure 2:
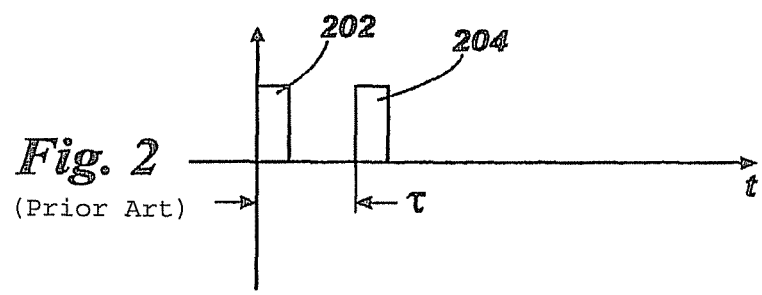
FIG. 2 is an interrogating waveform suitable for the package of FIG. 1.

Referring to FIG. 2, an interrogation of the package 102 of FIG. 1 may be carried out by introducing a pair of interrogating optical pulses 202, 204 into the package i/o fibre 112. Pulses 202, 204 have respective frequencies $\omega_1$, $\omega_2$ and pulse 204 is delayed by $\tau=2$ Lc with respect to pulse 202, L being the length of coil in the sensor and c being the speed of an optical pulse in the fibre.

Figure 3A:
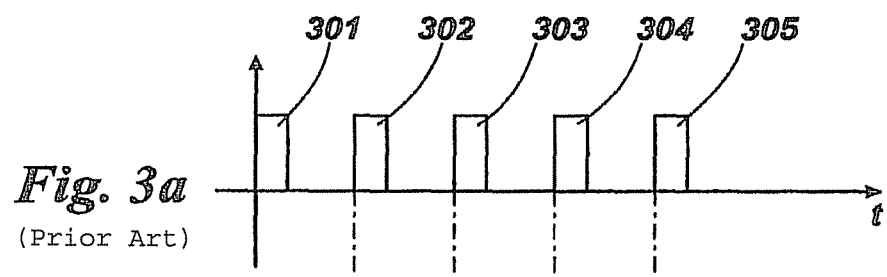
FIG. 3 illustrates a typical response from a package of the type shown in FIG. 1.
Figure 3B:
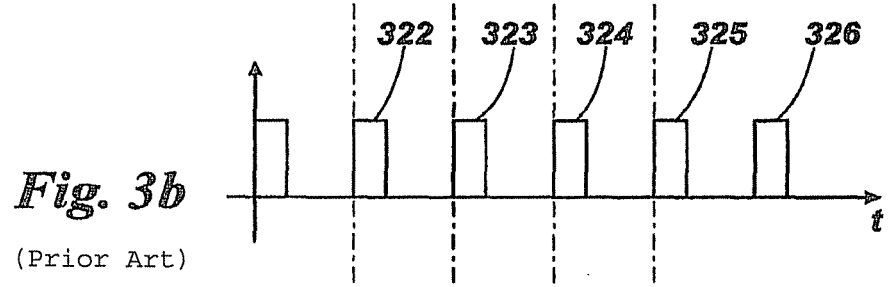
Figure 3C:
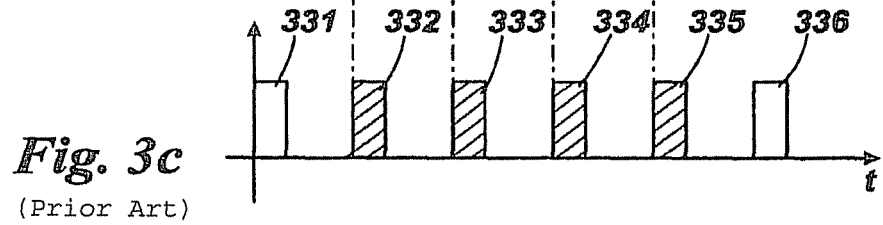

FIG. 3 illustrates the optical output response of the package by considering the output formed by each of the pair of input pulses. In FIG. 3a the first pulse 202 to arrive at the package is reflected off each of the 5 fibre-coupled mirrors to produce five output pulses 301, 302, 303, 304 and 305, measured relative to an arbitrary time reference. Similarly, looking at FIG. 3b, pulse 204 produces five time delayed output pulses 322, 323, 324, 325 and 326 relative to the same arbitrary time reference. Because the input pulses are delayed by twice the time of flight through a single coil, and because the pulses exist on the same fibre, the two sets of outputs are superposed to produce six pulses 331, 332, 333, 334, 335 and 336 shown in FIG. 3c. It will be understood that pulses 332 to 335 (shown shaded) correspond to the combination of a pulse which has passed (twice) through the coil between the two adjacent mirrors, and a pulse which has not. Furthermore, the pulses which are combined have different frequencies, by virtue of the input pulses 202 and 204 having different frequencies. The effect of the frequency difference between the pulses which are combined is the generation of a carrier frequency onto which phase information is modulated. Phase detection can therefore be used to determine the phase change imposed by that coil, and hence a measure of the sensed parameter is obtained as is known in the art.

If $\phi(t)$ is the sensed parameter, then the signal obtained from a photodetector used to measure a series of pulses returning from a sensor of the type described above can be written as $\cos(\omega_c t+\phi(t))$ i.e. the sensed information is represented as a phase change superimposed on a carrier signal of frequency $\omega_c$. Techniques that are well known to those skilled in the art can then be used to demodulate the phase signal from the carrier. The carrier frequency is typically chosen to be half of the Nyquist frequency, which is in turn half of the sampling frequency. It is usual for one sample to be made in each returning optical pulse and so the sampling frequency is the rate at which pulse pairs are transmitted into the array. By way of an example, the sampling frequency could be approximately 320 kHz, giving a Nyquist frequency of approximately 160 kHz and a carrier frequency of approximately 80 kHz. The sampling frequency will typically have a practical upper limit dependent upon the type and arrangement of sensor or sensors, amongst other factors.

An overscale condition occurs when the instantaneous frequency of the phase modulated carrier falls outside the Nyquist band i.e. when $$\frac{d\varphi(t)}{dt} \geq \omega_N - \omega_c$$

or when $$\frac{d\varphi(t)}{dt} \leq -\omega_c,$$

where $\omega_N$ and $\omega_c$ are the Nyquist and carrier frequencies respectively. In practice this results in aliasing of instantaneous frequency back into the Nyquist band by folding or wrapping around one of its limits in frequency space. Depending on the magnitude and frequency of the sensed parameter, the instantaneous frequency can be wrapped back multiple times. If the sensed parameter is modelled approximately as $\phi(t)=\phi_0 \cos \omega_m t$, then the condition for overscale not occurring, for the usual condition of $\omega_N=2\omega_c$ is sometimes expressed as $$\varphi_0 \leq \frac{\omega_c}{\omega_m}.$$

Figure 4:
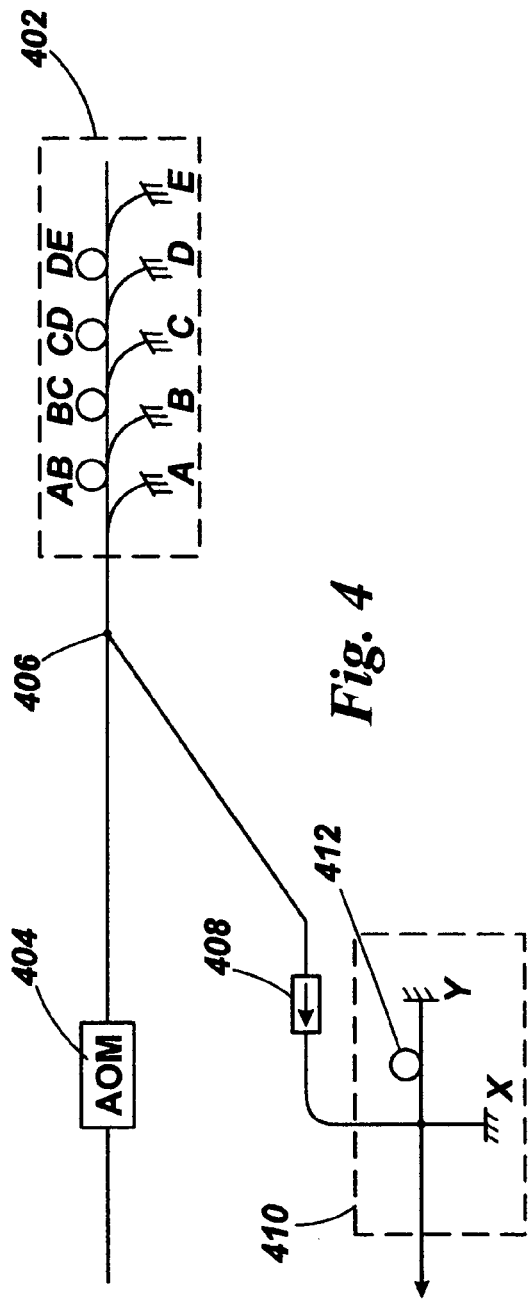
FIG. 4 shows a system for interrogating a fibre optic package according to an aspect of the invention.

FIG. 4 illustrates interrogation of a sensor package as described in PCT/GB2008/000830. The package 402 is interrogated by a pair of pulses produced by acousto-optic modulator 404. The output series of pulses is tapped off at junction 406, passed through an isolator 408, and to a phase detector such as an output interferometer designated by 410. In the scheme of FIG. 4, the delay between input pulses is arranged to be twice the time of flight of light through delay coil 412 of the output interferometer. While the described embodiment employs a Michelson interferometer, the skilled reader would recognise that a Mach-Zehnder type interferometer with a delay coil in one of the arms could equally be used. In this case, arranging for the separation between the input pulses to be just the time of flight through the delay coil in one arm of the interferometer would allow equivalent measurements to be made.

Figure 5:
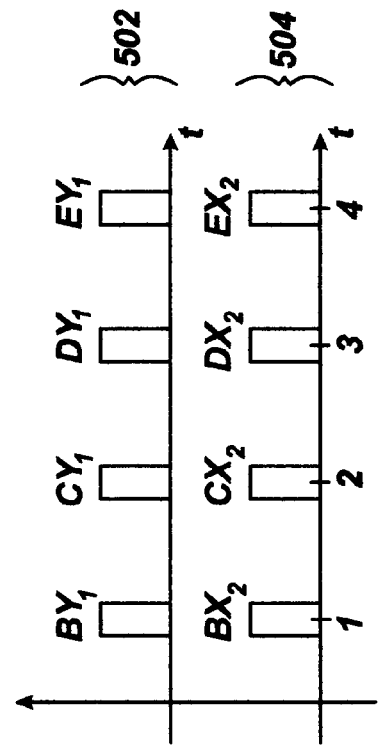
FIG. 5 illustrates an output obtainable from the system of FIG. 4.

FIG. 5 illustrates component pulse trains output from interferometer 410. Pulse train 502 represents the output of the leading input pulse (designated by subscript 1) from mirrors B to E, resulting from the delay arm of the interferometer (designated Y). Pulse train 504 represents the output from the lagging input pulse (designated by subscript 2) from mirrors B to E, resulting from the undelayed arm of the interferometer (designated X) It can be seen that, in this way, interferometer 410 temporally aligns and interferes pairs of pulses, both of which have passed through the same sensing coil(s) of package 402, but at different times. In other words, each pulse reflected off fibre coupled mirrors B to E (pulses reflected off mirror A have not passed through a sensing coil), and gathering information on the associated sensing coil, is combined with a pulse having undergone the same optical path, gathering the same information, but at a later time. The alignment of pulses is such that one of each combined pair is a reflection from a leading input pulse (subscript 1), and the other from the lagging input pulse (subscript 2). As such, the pulses in a pair have a frequency difference which, as noted above, causes phase to be modulated onto a carrier signal.

The output of the interferometer therefore represents the derivative of the phase value, in contrast to the actual value of phase which would usually be measured directly. Thus using the terminology above, if the signal returned from the transducer is $\cos(\omega_c t+\phi(t))$ with $\phi(t)$ being a measure of the sensed parameter, the system depicted in FIG. 4 derives a value representative of $$\frac{d\varphi(t)}{dt},$$

or the instantaneous frequency of the returned signal.

Considering the combined output pulse centred at t=1, it will be understood that this represents the combination of two pulse having been reflected from mirror B, ie having passed through sensing loop AB, at two different times. The derivative of the parameter sensed by coil AB is therefore contained within and can be determined from this pulse. In a similar way, the pulse output from the interferometer at t=2 will be a combination of pulses, both of which have made double passes of sensing loops AB and BC. Once the derivative value is extracted from this pulse then, by subtracting the derivative value of sensing loop AB (obtained above) the derivative value of sensing loop BC is obtained. In this way, the derivative values for each of the sensing loops in package 402 can be obtained.

Figure 6:
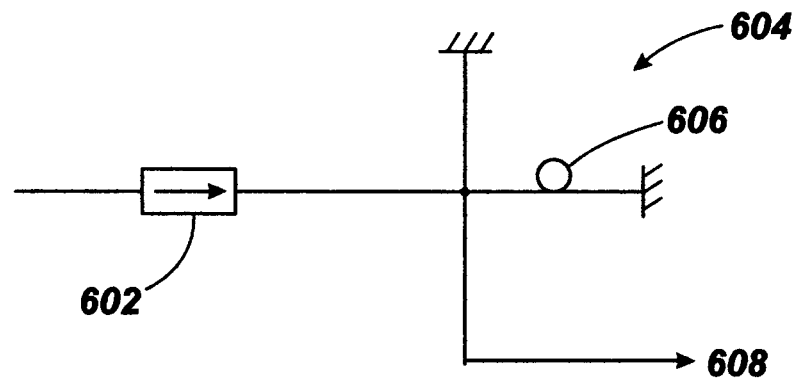
FIG. 6 shows an arrangement according to an embodiment of the invention.

In FIG. 6, a single pulse returning from a transducer or transducer array passes through an isolator 602 and enters an output interferometer generally designated 604. A delay 606 in one arm of the interferometer creates a version of the pulse which is delayed by an amount less than the pulse duration. This delayed version is combined with an undelayed version (from the other arm of the interferometer) in the interferometer and resulting signal is output at 608 for demodulation.

Figure 7:
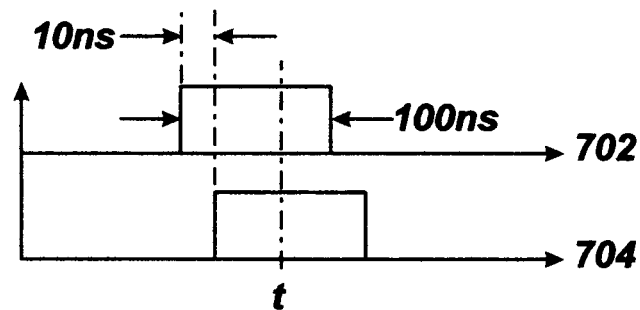
FIG. 7 illustrates the output of the arrangement of FIG. 6.

FIG. 7 illustrates the effect of the apparatus of FIG. 6. An input pulse of 100 ns duration is taken as an example. A suitable interferometer delay for such a pulse is approximately 10 ns which can be achieved with a 1 m delay coil. The pulse produced by the undelayed arm of the interferometer is shown at 702, and the corresponding delayed pulse at 704. It can be seen that because the delay is less than the pulse duration, the pulses overlap in time. If we consider a measurement made of the interference between the two pulses at a time t, it will be understood that the sampled portion of the delayed pulse will have passed through the transducer 10 ns before the sampled portion of the undelayed equivalent with which it now interferes.

In the method described with reference to FIGS. 4 and 5, phase is captured by the interference of two pulses having a slight frequency difference, typically about 50 kHz. When the pulses interfere this frequency difference causes a carrier signal to be generated which the dynamic signal then modulates, making it easier to extract the dynamic signal. For the arrangement shown in FIGS. 6 and 7 however, the two interfering pulses have the same frequency because they are versions of a single pulse having only a single frequency. There is therefore no carrier signal, making extraction of the dynamic signal more difficult.

Figure 8:
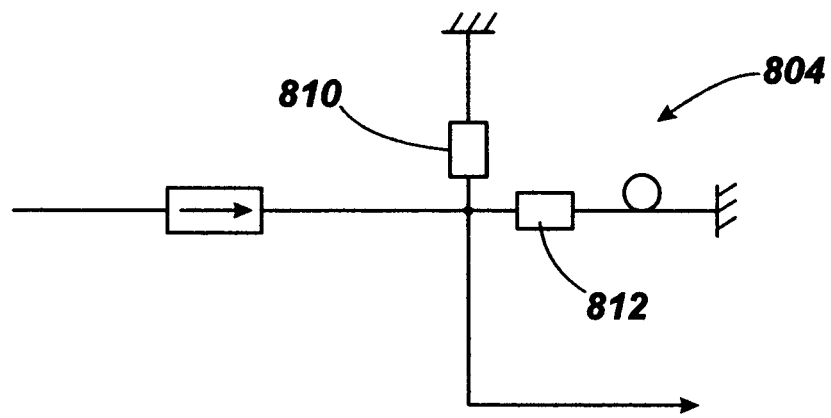
FIG. 8 shows an arrangement according to a further embodiment of the invention.

FIG. 8 illustrates an arrangement which addresses this difficulty. Output interferometer 804 includes acousto-optic modulators (AOMs) 810 and 812 in both arms. One of the AOMs is driven by a continuous RF signal at f1 while the other is driven at f2. Each time the light passes through an AOM its frequency is shifted by the RF drive frequency. As the light makes a double pass through the AOMs the pulses that return from the two arms will differ in frequency by 2(f1−f2). If f1−f2=25 kHz then two output pulses will differ by 50 kHz and so a 50 kHz carrier will be generated as usual.

The level of the derivative signal is proportional to the difference in time between when the pulses pass through the sensor. In the above example, a derivative signal will be generated based on a time delay of 10 ns which is shorter than the minimum value that is practicably achievable with the derivative technique described above with reference to FIGS. 4 and 5. Consequently a larger dynamic signal can be measured. It would be possible to measure still larger signals by reducing the path difference of 1 m, and hence the delay, to a smaller value.

Although increased levels of dynamic signal are accommodated, embodiments of the present invention will experience reduced SNR, which will be particularly low when the normal signal is only just over loaded. Direct reconstruction of the normal signal (as described in PCT/GB2008/000830 for example) may then be problematic, and so the arrangement of FIG. 9 is proposed.

Figure 9:
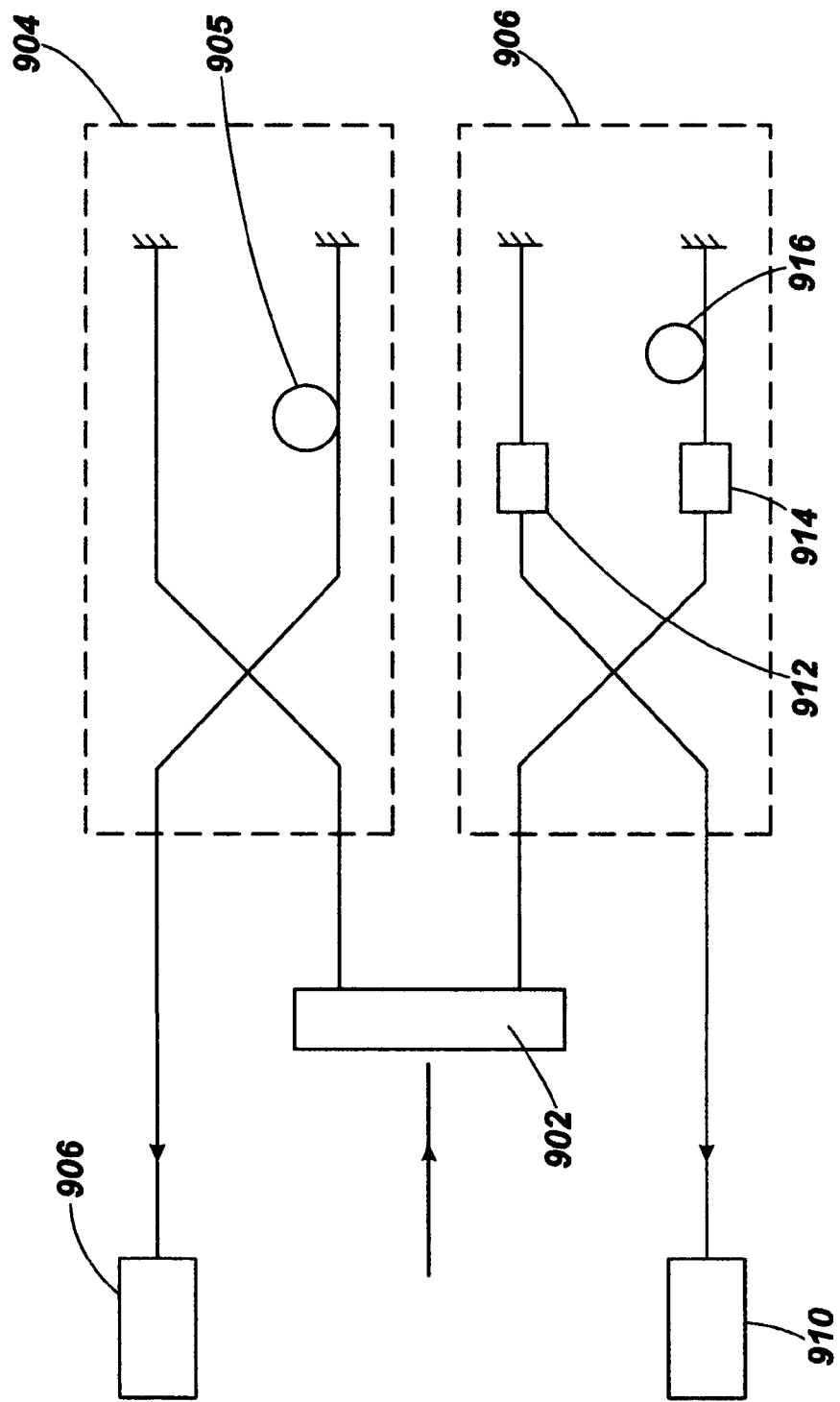
FIG. 9 illustrates an arrangement capable of producing multiple outputs.

The system of FIG. 9 is adapted to receive the output from a series of sensors each sensing coil comprising 40 m of optical fibre. In this case a double pass of light through each sensor will take approx 400 ns. A series of pairs of optical pulses at frequencies that differ by 50 kHz are transmitted into the array, with the separation of the two pulses in a pair being 200 ns. Light returning from the sensors is split at splitter 902. One half of the returning light passes to interferometer 904 which includes a 20 m (~200 ns) path imbalance 905, and is subsequently output to photodetector 906 to measure both the normal and standard derivative signals.

Figure 10:
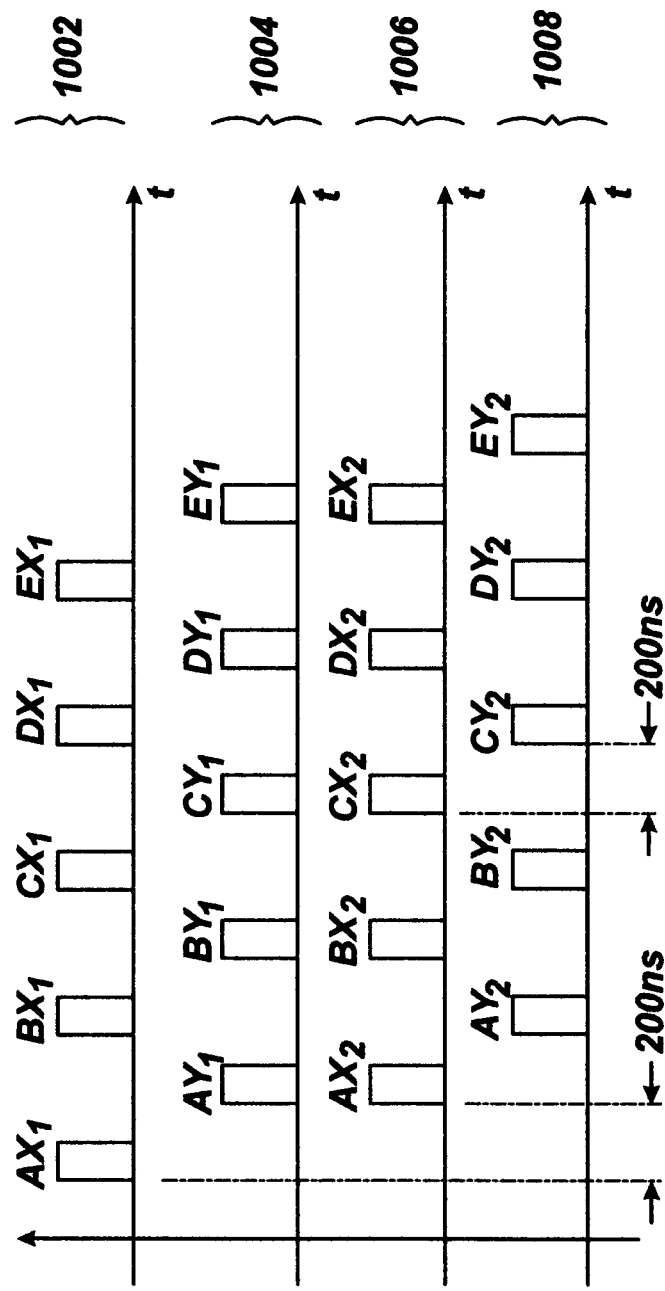
FIG. 10 illustrates the function of part of the system of FIG. 9.

Interferometer 904 operates as described in PCT/GB2008/000830 to produce pulse trains as illustrated in FIG. 10 (with notation X and Y referring to the undelayed and delayed arms of the interferometer respectively).

Reflections from the same reflector (denoted A, B . . . ) of the transducer package of the leading and lagging (denoted subscript 1 and 2) pulse are aligned and interfered, in substantially the same way as described with reference to FIG. 5, as seen from pulse trains 1004 and 1006. This therefore provides derivative or 'low sensitivity' information for each sensor coil (cumulatively). In addition reflections from adjacent reflectors of the package of leading and lagging pulses are aligned and interfered as seen from pulse trains 1002 and 1008 which are essentially of the same form as shown in FIG. 3, and combine to form output pulses carrying the direct or 'high sensitivity' parameter values. Interferometer 904 therefore produces an output having two different sensitivities in the form of interleaved pulse trains. Pulses having a frequency difference are interfered such that the sensed information is modulated onto a 50 Hz carrier and can be extracted directly in the known fashion.

The other half of the returning light passes from splitter 902 to interferometer 908 which contains two AOMs 912 and 914 and a 1 m path imbalance 916 substantially as described with respect to FIG. 6, and then onto photodetector 910.

Before passing through any interferometer the reflections from the two optical pulses in a pair do not overlap and so they can be treated as a single return pulse, and interferometer 908 functions as described previously to produce 'very low sensitivity' derivative phase modulated onto a 50 Hz carrier. This illustrates the principle that although only a single pulse is used to extract the very low sensitivity information, this does not preclude two pulses being input to the transducer package. All signals are a modulated 50 kHz carrier, and so they can each be demodulated using the same method.

As a result, the arrangement of FIG. 9 produces 3 outputs representing a parameters sensed by the same transducer package, but all having different sensitivities, which enables a very wide range of signal amplitudes to be measured. This result is achieved from a single interrogating waveform comprising a pair of time spaced pulses.

It will be understood that the present invention has been described above purely by way of example, and modification of detail can be made within the scope of the invention.

Although a fibre optic sensor package suitable for seismic surveying has been described, it will be appreciated by the skilled person that the invention is equally applicable to other types of phase based transducers employed in alternative applications. Examples include uses of fibre optic hydrophones in active sonar systems and measurements of surface vibration using a free space optical interferometer.

Each feature disclosed in the description, and (where appropriate) the claims and drawings may be provided independently or in any appropriate combination.

The invention claimed is:

1. A method of interrogating a phase based transducer, said transducer providing a change in phase of signal propagation in response to a sensed parameter, said method comprising:
   passing a single pulse through the transducer, and receiving the single pulse at a phase detector,
   combining a delayed version and an undelayed version of said single pulse signal within the phase detector, the delayed and undelayed versions both having passed through the transducer; and
   determining from said combination a measure of the rate of change of phase with time of said signal.

2. A method according to claim 1, further comprising shifting the frequency of the delayed version relative to the frequency of the undelayed version.

3. A method according to claim 1, wherein the method comprises passing the signal through an output interferometer.

4. A method according to claim 1, wherein the received single pulse signal is part of a series of pulses.

5. A method according to claim 1, wherein said delayed version is delayed by a time period less than the pulse duration.

6. A method according to claim 1, wherein said delayed version is delayed by less than 100 ns.

7. A method according to claim 1, wherein said single pulse signal comprises a single frequency.

8. A method according to claim 1, further comprising obtaining a value of phase based on said measured rate of change of phase.

9. A method according to claim 1, wherein said transducer comprises at least one intrinsic fibre optic sensor.

10. A method according to claim 1, wherein the signal received from the transducer has a carrier frequency, and wherein the magnitude of the peak instantaneous frequency of said signal is greater than or equal to the magnitude of the carrier frequency.

11. A method according to claim 1, wherein the phase based transducer is one of a hydrophone, a geophone or an accelerometer.

12. A method for interrogating a multiplexed fibre optic seismic array according to claim 1.

13. A system for interrogating a phase based transducer, said transducer providing a change in phase of signal propagation in response to a sensed parameter, said system comprising:

a phase detector configured to receive a single pulse passed through said transducer, the phase detector including a delayed arm for producing a delayed version of said signal having a delay time period less than the duration of said single pulse signal and an undelayed arm for producing an undelayed version of said signal received at the phase detector the delayed and undelayed versions both having passed through the transducer, wherein the phase detector is adapted to combine said undelayed signal with said delayed signal as an output signal; and a demodulator configured to receive the output signal from the phase detector, said demodulator arranged to determine a measure of the rate of change of phase of said received signal.

14. A system according to claim 13, wherein said phase detector includes a frequency shifter for shifting the frequency of the delayed version relative to the frequency of the undelayed version.

15. A system according to claim 13, wherein the received single pulse signal is part of a series of pulses.

16. A system according to claim 13, wherein said delay has a time period less than 100 ns.

17. A system according to claim 13, further comprising a signal source for providing an input signal to said transducer.

18. A system according to claim 17 wherein said input signal comprises a series of single frequency pulses.

19. A system according to claim 17 wherein said input signal comprises a series of temporally spaced pulse pairs.

20. A method of interrogating a phase based transducer, said transducer providing a change in phase of signal propagation in response to a sensed parameter, said method comprising:

passing a single pulse having a single frequency through the transducer, and receiving the single pulse at a phase detector, combining a delayed version and an undelayed version of the received single frequency signal within the phase detector, the delayed and undelayed versions both having passed through the transducer; and determining from said combination a measure of the rate of change of phase with time of said signal.

* * * * *